(12) United States Patent
Chu et al.

(10) Patent No.: US 7,295,530 B2
(45) Date of Patent: Nov. 13, 2007

(54) SYSTEM AND METHOD FOR COMMUNICATION CONNECTION VIA HETEROGENEOUS NETWORKS

(75) Inventors: Wuo-Hui Chu, Taipei (TW); Jey-Lin Hsiao, Taipei (TW); Chen-Chi Wang, Zhongli (TW)

(73) Assignee: Benq Corporation, Taoyuan (TW)

( * ) Notice: Subject to any disclaimer, the term of this patent is extended or adjusted under 35 U.S.C. 154(b) by 731 days.

(21) Appl. No.: 10/823,865

(22) Filed: Apr. 14, 2004

(65) Prior Publication Data

US 2004/0208156 A1    Oct. 21, 2004

(30) Foreign Application Priority Data

Apr. 15, 2003    (TW) .............................. 92108632 A

(51) Int. Cl.
    *H04B 7/15*    (2006.01)
(52) U.S. Cl. ...................... 370/315; 370/474; 370/401; 455/7; 455/11.1
(58) Field of Classification Search ................ 370/315, 370/285, 401, 474; 455/7, 11.1, 12.1, 14–25
    See application file for complete search history.

(56) References Cited

U.S. PATENT DOCUMENTS

| | | | | |
|---|---|---|---|---|
| 6,044,062 A | * | 3/2000 | Brownrigg et al. | ......... 370/238 |
| 6,132,306 A | * | 10/2000 | Trompower | ................ 455/11.1 |
| 6,862,430 B1 | * | 3/2005 | Duffy et al. | ............... 455/11.1 |
| 2004/0160986 A1 | * | 8/2004 | Perlman | ..................... 370/480 |
| 2004/0185777 A1 | * | 9/2004 | Bryson | ...................... 455/41.1 |
| 2004/0185845 A1 | * | 9/2004 | Abhishek et al. | ........ 455/422.1 |
| 2004/0192227 A1 | * | 9/2004 | Beach et al. | ............... 455/90.3 |

OTHER PUBLICATIONS

China Patent Office Action mailed Jan. 6, 2006, (Rec'd Apr. 18, 2006 with IDS).

* cited by examiner

*Primary Examiner*—Edward F. Urban
*Assistant Examiner*—Blane J Jackson
(74) *Attorney, Agent, or Firm*—Thomas, Kayden, Horstemeyer & Risley

(57) ABSTRACT

A method for communication connection via heterogeneous networks. A first electronic device transmits a first data packet to a first wireless bridge. The first wireless bridge attaches a first tunnel header to the first data packet to form a first wireless data packet, and transmits the first wireless data packet via the wireless network. A second wireless bridge receives the first wireless data packet via the wireless network, removing the first tunnel header therefrom to acquire a second data packet, stores an association relationship between the first electronic device and the first wireless bridge, and transmits the second data packet to the second electronic device. The second electronic device receives the second data packet and transmits data to the first electronic device.

18 Claims, 7 Drawing Sheets

SYSTEM AND METHOD FOR COMMUNICATION CONNECTION VIA HETEROGENEOUS NETWORKS

BACKGROUND OF THE INVENTION

1. Field of the Invention

The present invention relates to data transmission, and more particularly, to a method and system for communication connection via heterogeneous networks, such as Ethernet and wireless local area network (WLAN).

2. Description of the Related Art

A network is a communication system that links two or more computers and peripheral devices, and allows users to access resources on other computers and exchange messages with other users. A network allows users to share resources on their own systems with other network users and to access information on centrally located systems or systems that are located at remote offices. Currently, two types of networks, such as local area networks (LANs) and wireless local area networks (WLANs) are integrated for data communication via both wired and wireless mediums.

Advances in WLAN technology have led to the emergence of publicly accessible WLANs (e.g., "hot spots") at airports, cafes, libraries and other public facilities. The WLAN uses radio frequency transmission to communicate between roaming mobile terminals and access points (or base stations). A WLAN is a type of local area network employing high-frequency radio waves rather than wires to communicate between mobile terminals. In a WLAN, an access point is a station that transmits and receives data, referred to as a transceiver. FIG. 1 is a diagram of the system architecture of a conventional WLAN. A mobile terminal 400 communicates with mobile terminals 410, 420, 430 and 440 via an access point (AP) 405 using wireless packets.

A LAN is a network located in a relatively small physical area, such as a building, in which computers and other network devices are linked, usually via a wire-based cabling scheme. A LAN typically includes numerous significant network devices, such as switches, routers, access points and the like, to transmit information from a source device to one or more destination devices.

Thus, a need exists for a system and method for communication connection via heterogeneous networks, such as Ethernet and WLAN.

SUMMARY OF THE INVENTION

It is therefore an object of the present invention to provide a system and method for communication connection via heterogeneous networks, such as Ethernet and wireless local area network (WLAN).

According to the invention, a wireless network comprises multiple wireless bridges individually associated with at least one electronic device. The wireless bridge comprises an extended bridge, an inter-building bridge or a repeater.

A method for communication connection in wireless network performs the following process. A first electronic device transmits a first data packet to a first wireless bridge. The first data packet comprises a source address for a first identity corresponding to the first electronic device, and a destination address for a second electronic device corresponding to a second electronic device. The first wireless bridge attaches a first tunnel header to the first data packet to form a first wireless data packet, and transmits the first wireless data packet via the wireless network. Preferably, the first wireless bridge transmits the first wireless data packet via the wireless network by a broadcast method. A wireless bridge other than the first wireless bridge receives the broadcasted wireless data packet, and stores the association relationship between the first electronic device and the first wireless bridge according to the first identity and the third identity. The first tunnel header comprises a third identity corresponding to the first wireless bridge. The first tunnel header further comprises a receiving address for the broadcast method, and a protocol type. The protocol type preferably comprises a constant "0x5628". A second wireless bridge receives the first wireless data packet via the wireless network, removing the first tunnel header therefrom to acquire a second data packet, stores an association relationship between the first electronic device and the first wireless bridge, and transmits the second data packet to the second electronic device. The second electronic device receives the second data packet, respectively employs the first identity and the second identity as a destination address and a source address, and transmits data to the first electronic device. The first electronic device and the second electronic device establish communication connection with each other. The second electronic device transmits a third data packet to the second wireless bridge. The third data packet comprises the first identity as a destination address, and the second identity as a source address. The second wireless bridge attaches a second tunnel header to the third data packet to form a second wireless data packet according to the stored association relationship. The second tunnel header comprises a receiving address for the third identity, and a temporary transmitting address for a fourth identity corresponding to the second wireless bridge and the protocol type. The first wireless bridge receives the second wireless data packet, removes the second tunnel header to acquire a fourth data packet, and stores an association relationship between the second wireless bridge and the second electronic device. The first electronic device receives the fourth data packet.

A system for communication connection in the wireless network comprises a first electronic device, a first wireless bridge, at least one second wireless bridge and at least one second electronic device. The first electronic device located in the wireless network transmits a packet. The packet comprises a first identity corresponding to the second electronic device, and is ignored by any electronic device other than the second electronic device. The first wireless bridge corresponding to the first electronic device receives the packet, attaches a tunnel header thereto, forming a wireless data packet for broadcast. The tunnel header comprises a receiving address for a broadcast method, and a protocol type. The protocol type preferably comprises a constant "0x5628". The second wireless bridge located in the wireless network receives the wireless data packet from the first wireless bridge, removes the tunnel header therefrom to acquire the packet. The second electronic device corresponding to the second wireless bridge receives the packet from the second wireless bridge.

Another method for communication connection in the wireless network comprises the following process. A first electronic device transmits a packet to a first wireless bridge. The packet comprises a first identity corresponding to the first electronic device. The first wireless bridge attaches a tunnel header to the packet to form a wireless data packet. The tunnel header comprises a second identity corresponding to the first wireless bridge, a receiving address for a broadcast method, and a protocol type. The protocol type preferably comprises a constant "0x5628". The first wireless bridge broadcasts the wireless data packet to a second wireless bridge via the wireless network. The second wireless bridge stores an association relationship between the first wireless bridge and the first electronic device according to the first identity and the second identity.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
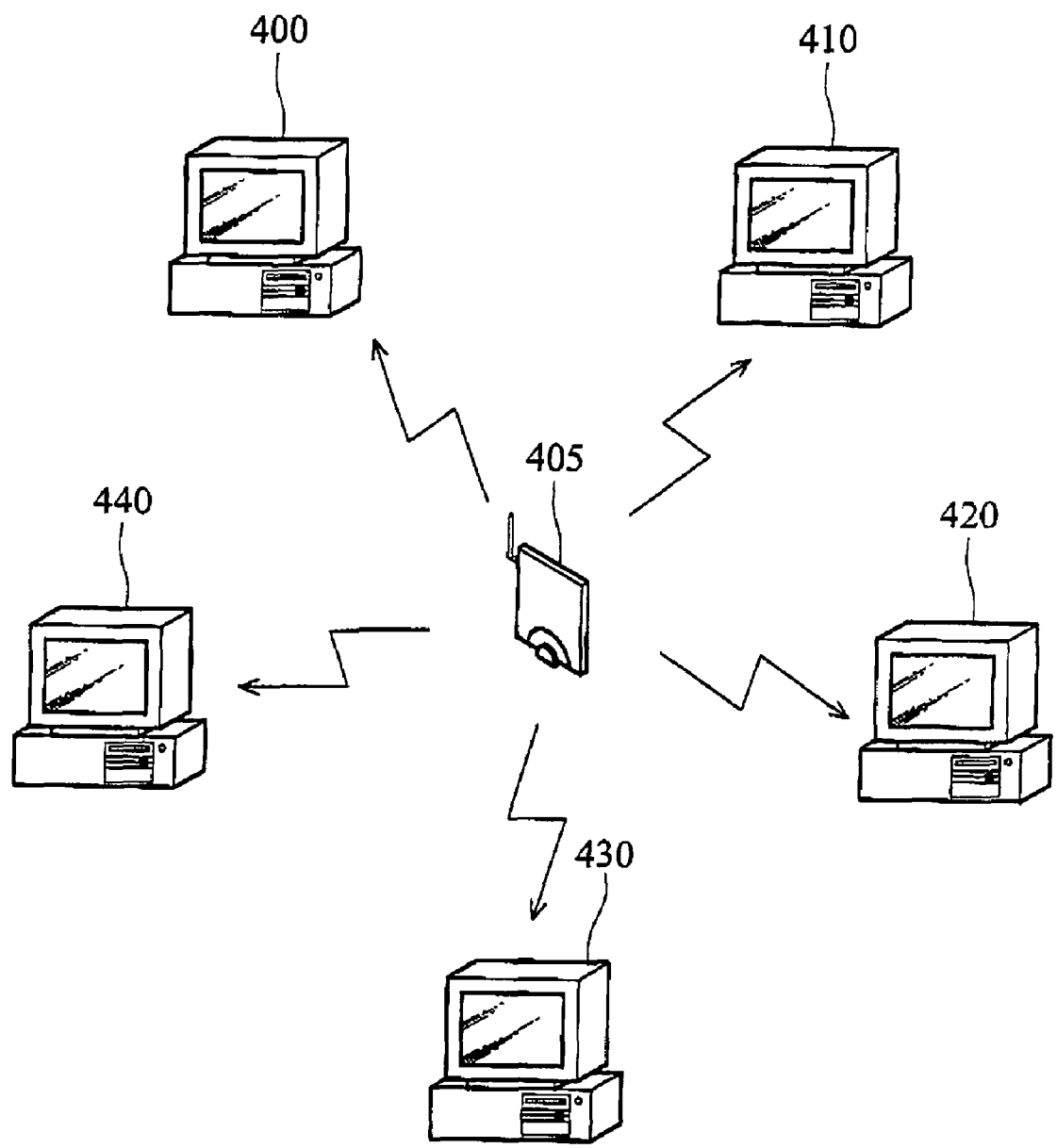
FIG. 1 is a diagram of the system architecture of a conventional WLAN.
Figure 2:
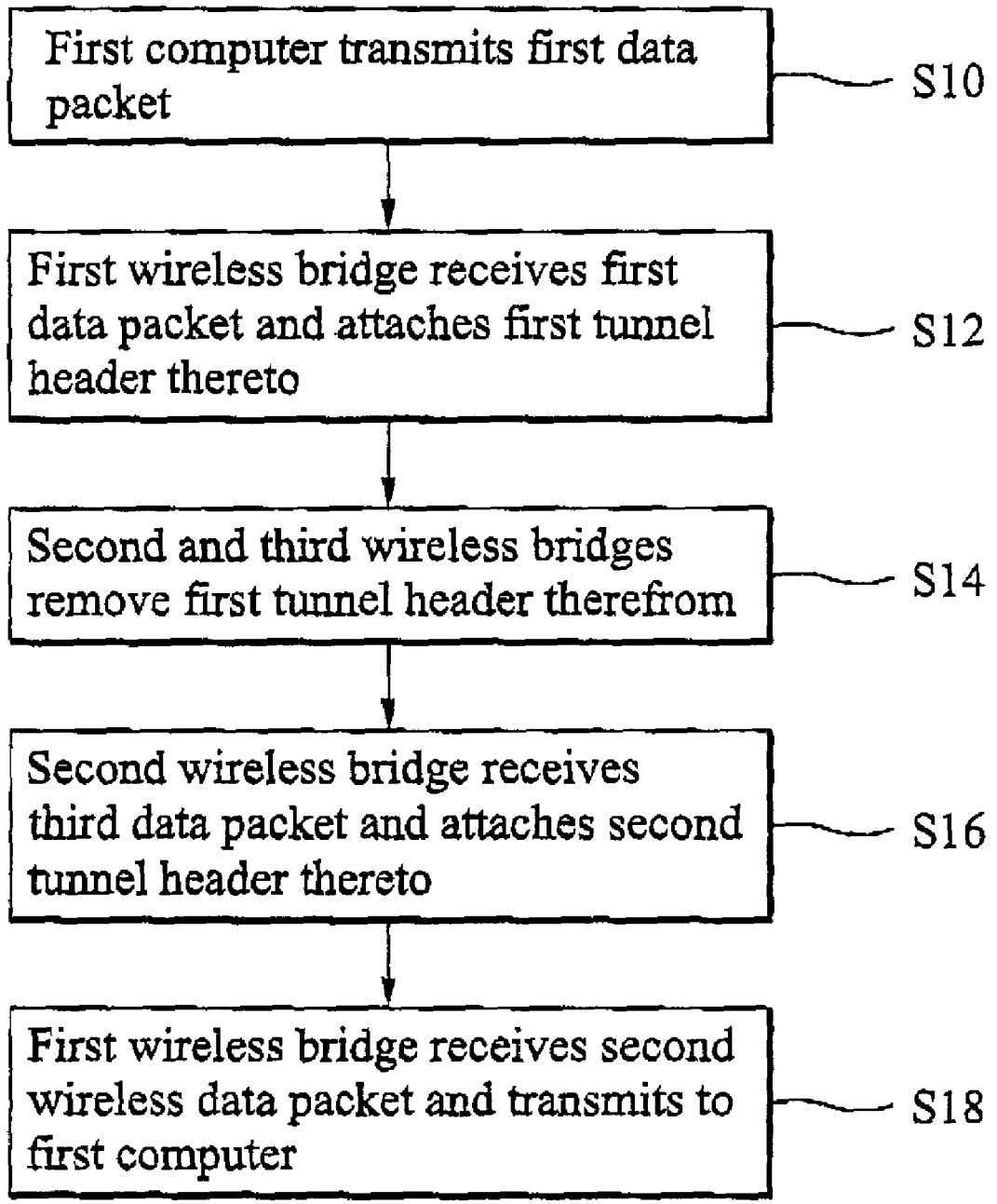
FIG. 2 is a flowchart of an exemplary wireless communication connection process according to the invention.

FIG. 2 is a flowchart of an exemplary communication connection process according to the invention. The method is utilized in a wireless network environment comprising a first wireless bridge, a second wireless bridge and a third wireless bridge. A first computer, a second computer and a third computer respectively connect to the first wireless bridge, the second wireless bridge and the third wireless bridge via wired Ethernet. The first wireless bridge, the second wireless bridge and the third wireless bridge transmit data via both high-frequency radio waves and wires. The wireless bridge may be an extended bridge, an inter-building bridge or a repeater.

Figure 3:
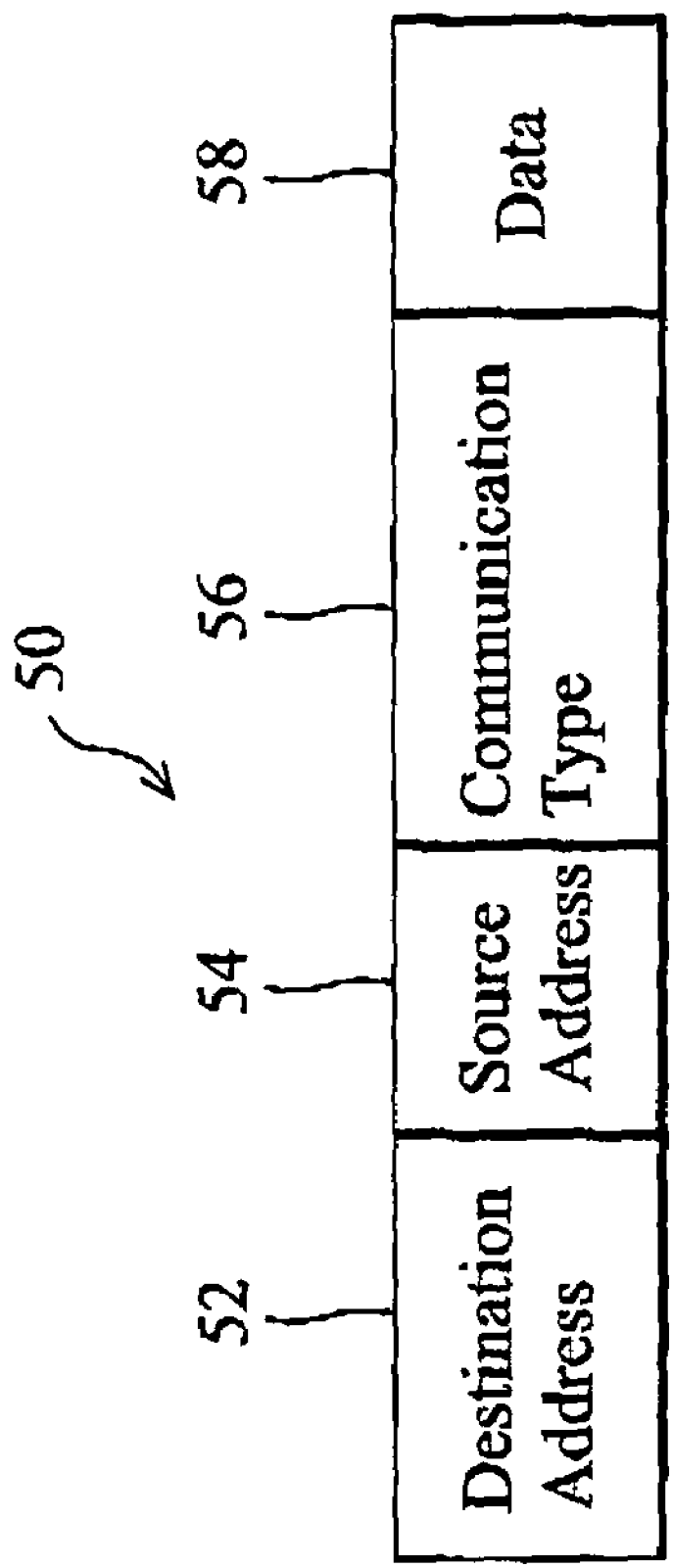
FIG. 3 is a diagram illustrating an exemplary data packet.

FIG. 3 is a diagram illustrating an exemplary data packet. In step S10, the first computer transmits a first data packet 50 to the first wireless bridge. The first data packet 50 includes a destination address (DA) 52 for a media access control (MAC) address of the second computer, a source address (SA) 54 for a MAC address of the first computer, a communication type 56 and data 58. The MAC address is the unique hexadecimal serial number assigned to each Ethernet network device to identify the first computer or the second computer on the network. With Ethernet devices, this address is permanently set at the time of manufacture.

Figure 4:
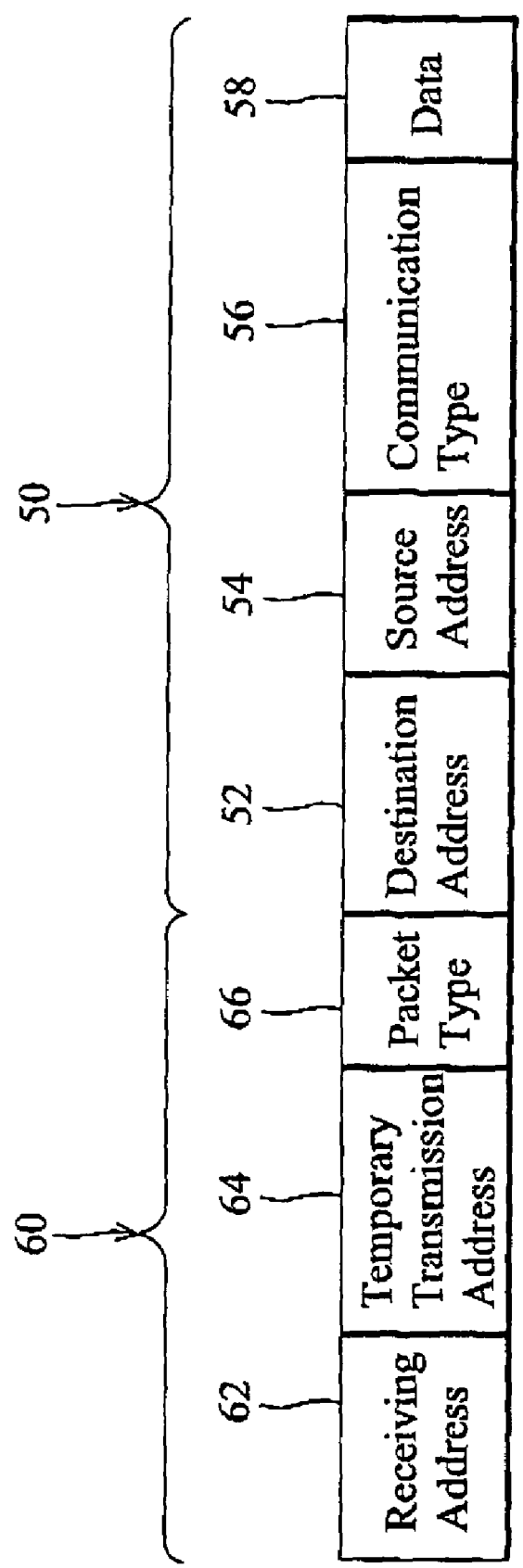
FIG. 4 is a diagram illustrating an exemplary first wireless data packet.

FIG. 4 is a diagram illustrating an exemplary first wireless data packet. In step S12, the first wireless bridge receives the first data packet 50 and attaches a first tunnel header 60 thereto. The first tunnel header 60 comprises a receiving address (RA) 62, a temporary transmission address (TA) 64 for a MAC address of the first wireless bridge and a packet type 66 comprising a constant "0x5628" indicating that the first data packet 50 is transmitted via Ethernet. Because the first wireless bridge does not know which wireless bridge the second computer is connected to, the RA field stores broadcast addresses for the second wireless bridge and the third wireless bridge. The first wireless bridge subsequently transmits the first wireless data packet including both the first tunnel header 60 and the first data packet 50 to the second wireless bridge and the third wireless bridge.

Figure 5:
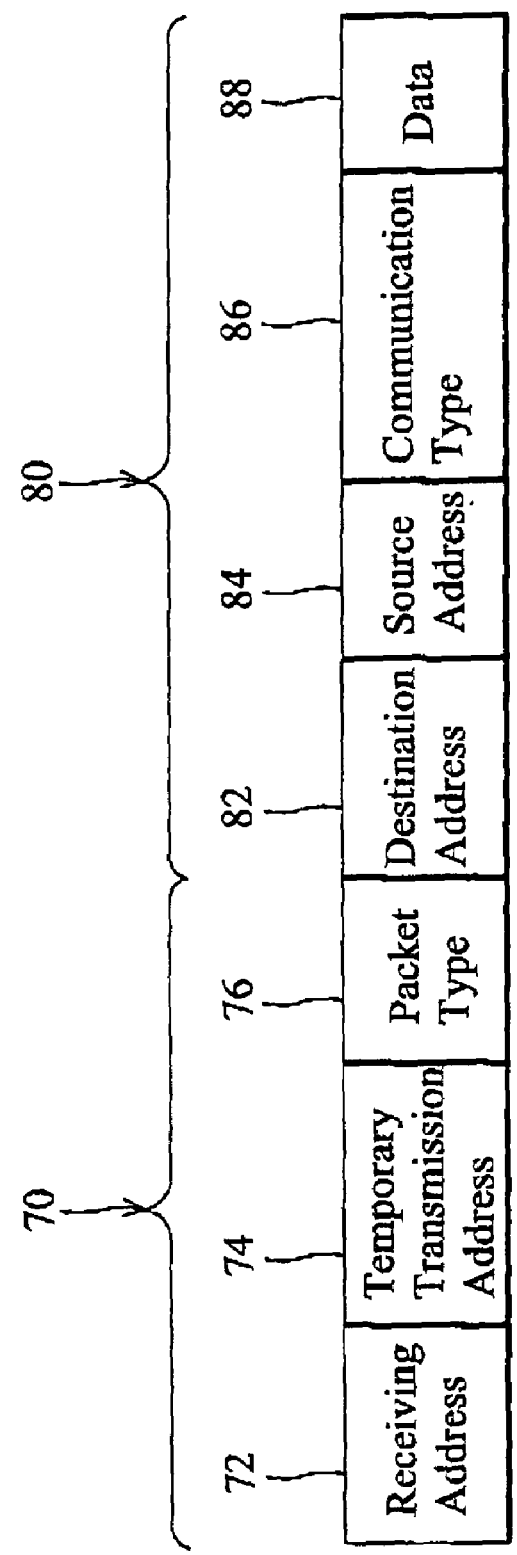
FIG. 5 is a diagram illustrating an exemplary second wireless data packet.

In step S14, the second and third wireless bridges receive the first wireless data packet, remove the first tunnel header 60 therefrom and store association information regarding the first computer transmits and receives data via the first wireless bridge. The second wireless bridge broadcasts the first data packet 50 to the second computer and the third wireless bridge broadcasts the first data packet 50 to the third computer. The third computer ignores the first data packet 50 because the DA therein does not correspond to itself. FIG. 5 is a diagram illustrating an exemplary second wireless data packet. Alternatively, the second computer receives the first data packet 50 and replies to the second wireless bridge with a second data packet 80. The second data packet 80 includes a destination address (DA) 82 for a MAC address of the first computer, a source address (SA) 84 for a MAC address of the second computer, a communication type 86 and reply data 88.

In step S16, the second wireless bridge receives the second data packet 80 from the second computer and attaches a second tunnel header 70 thereto to generate the second wireless data packet. The second tunnel header 70 comprises a RA 72 for the SAC address of the first wireless bridge corresponding to the stored association information, a TA 74 for a MAC address of the second wireless bridge and a packet type 76 comprising a constant "0x5628" indicating that the second data packet 80 is transmitted via Ethernet. The second wireless bridge transmits the second wireless data packet to the first wireless bridge according to the TA 74.

In step 318, the first wireless bridge receives the second wireless data packet, removes the second tunnel header 70 therefrom and stores association relationship information indicating the second computer is transmitting and receiving data via the second wireless bridge. The first wireless bridge broadcasts the second data packet 80 to the first computer.

Figure 6:
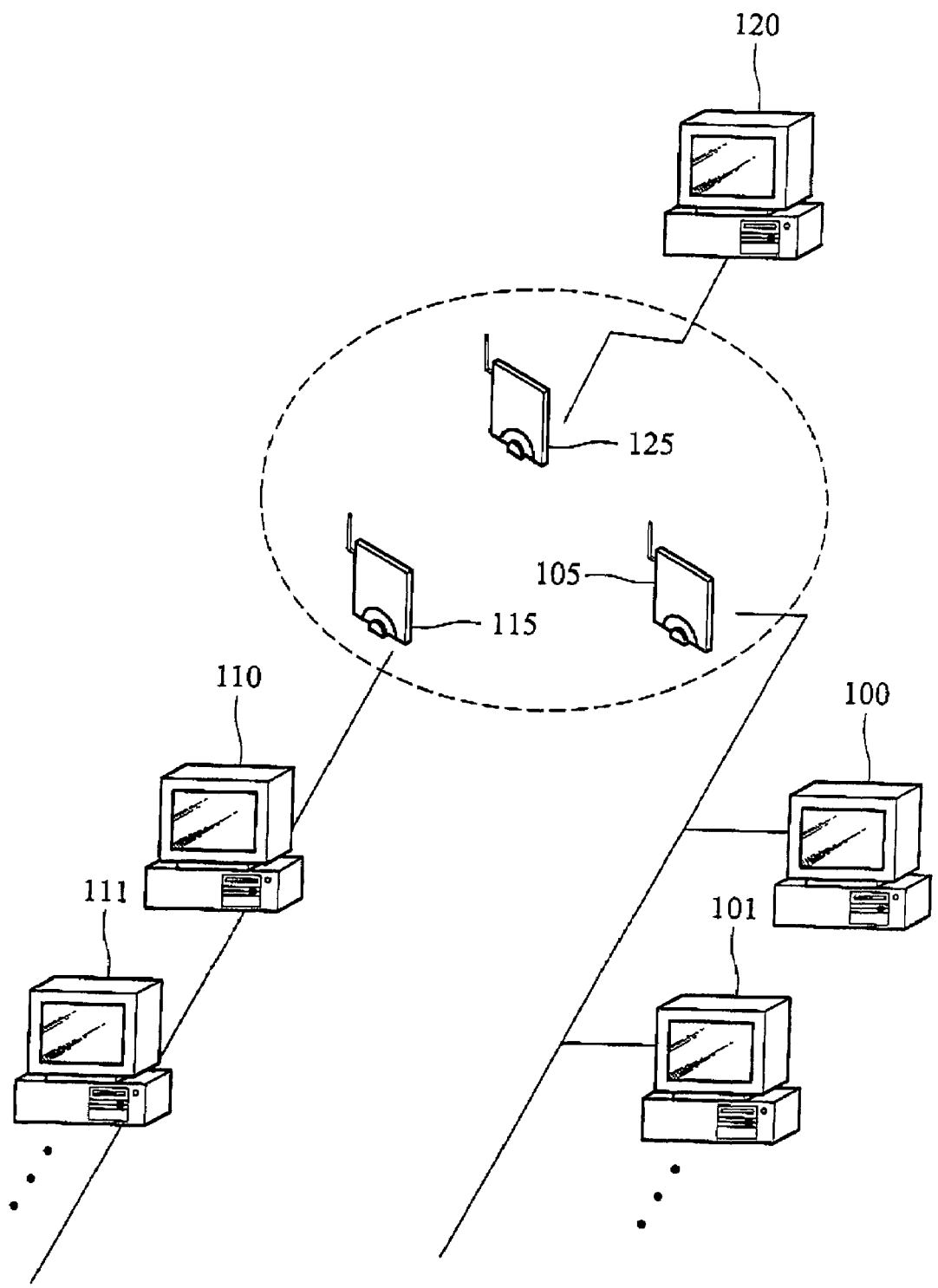
FIG. 6 is a system architecture diagram for communication connection via heterogeneous networks according to the first and second embodiments of the invention.

FIG. 6 is a diagram of the system architecture communication connection via heterogeneous networks according to the first two embodiments of the invention. The system architecture includes a first wireless bridge 105, a second wireless bridge 115 and a third wireless bridge 125, computers 100 and 101 connect to the first wireless bridge 105 via wired Ethernet, computers 110 and 111 connect to the second wireless bridge 115 via wired Ethernet, and a computer 120 connects to the third wireless bridge 125 via wired Ethernet.

The first embodiment illustrates a scenario wherein the computer 100 transmits data to the computer 110 via both wireless LAN and wired Ethernet using a broadcasting mechanism.

The computer 100 transmits the first data packet 50 to the wireless bridge 105. The first data packet 50 includes a destination address (DA) 52 for a MAC address of the computer 110, a source address (SA) 54 for a MAC address of the computer 100, a communication type 56 and data 58.

The wireless bridge 105 receives the first data packet 50 and attaches the first tunnel header 60 thereto. The first tunnel header 60 comprises a receiving address (RA) 62, a temporary transmit address (TA) 64 for a MAC address of the wireless bridge 105 and a type 66 comprising a constant "0x5628" indicating that the first data packet 50 is transmitted via Ethernet. Because the first wireless bridge does not know which wireless bridge the second computer is connected to, the RA field stores broadcast addresses for wireless bridges 115 and 125. The wireless bridge 105 subsequently broadcasts the first wireless data packet including both the first tunnel header 60 and the first data packet 50 to the wireless bridges 115 and 125.

The wireless bridge 125 receives the first wireless data packet, removes the first tunnel header 60 therefrom and stores association information indicating that the computer 100 transmits and receives data via the wireless bridge 105. The wireless bridge 125 ignores the first data packet because the DA therein does not correspond to any computer in its network. The association information is utilized for subsequent data transmission to the computer 100.

The wireless bridge 115 receives the first wireless data packet, removes the first tunnel header 60 therefrom and stores association information indicating that the computer 110 transmits and receives data via the wireless bridge 105. The wireless bridge 115 broadcasts the first data packet 50 to the computers 110 and 111. The computer 111 ignores the first data packet 50 because the DA therein does not correspond to itself. Alternatively, the computer 110 receives the first data packet 50 and replies to the wireless bridge 115 with the second data packet 80. The second data packet 80 includes a destination address (DA) 82 for a MAC address of the computer 100, a source address (SA) 84 for a MAC address of the computer 110, a communication type 86 and reply data 88.

The second embodiment illustrates a scenario wherein the computer 100 transmits data to the computer 120 via both wireless LAN and wired Ethernet using an end-to-end transmission mechanism.

The computer 100 transmits the first data packet 50 to the wireless bridge 105. The first data packet 50 includes a destination address (DA) 52 for a MAC address of the computer 120, a source address (SA) 54 for a MAC address of the computer 100, a communication type 56 and data 58.

The wireless bridge 105 receives the first data packet 50 and attaches the first tunnel header 60 thereto. The first tunnel header 60 comprises a receiving address (RA) 62 for a basic service setup ID (BSSID), a temporary transmission address (TA) 64 for a MAC address of the wireless bridge 105 and a type 66 comprising a constant "0x5628" indicating that the first data packet 50 is transmitted via Ethernet. The BSSID identifying the wireless bridge 125 is predetermined. The wireless bridge 105 subsequently transmits the first wireless data packet including both the first tunnel header 60 and the first data packet 50 to the wireless bridge 125 according to the BSSID in the RA 62.

The wireless bridge 125 receives the first wireless data packet, removes the first tunnel header 60 therefrom and stores association information indicating that the computer 110 transmits and receives data via the wireless bridge 105. The wireless bridge 125 transmits the first data packet 50 to the computer 120 according to the content of the DA 52.

The computer 120 receives the first data packet 50 and replies to the wireless bridge 125 with the second data packet 80. The second data packet 80 includes a DA 82 for the MAC address of the computer 100, a SA 84 for a MAC address of the computer 120, a communication type 86 and reply data 88.

The wireless bridge 125 receives the second data packet 80, attaches a second tunnel header 70 thereto. The second tunnel header 70 comprises a RA 72 for the MAC address of the wireless bridge 105, a TA 74 for the MAC address of the wireless bridge 125 and a packet type 76 comprising a constant "0x5628" indicating that the second data packet 80 is transmitted via Ethernet. The wireless bridge 125 subsequently transmits a second wireless data packet including both the second tunnel header 70 and the second data packet 80 to the wireless bridge 105 according to the content of the RA 72.

The wireless bridge 105 receives the second wireless data packet, removes the second tunnel header 70 therefrom to acquire the second data packet 80, and transmits the second data packet 80 to computer 100 according to the content of DA 82.

The wireless bridges 105, 115 and 125 may be extended bridges, and computers 100, 101, 110, 111 and 120 may be personal computers, personal digital assistants (PDAs) or the like.

Figure 7:
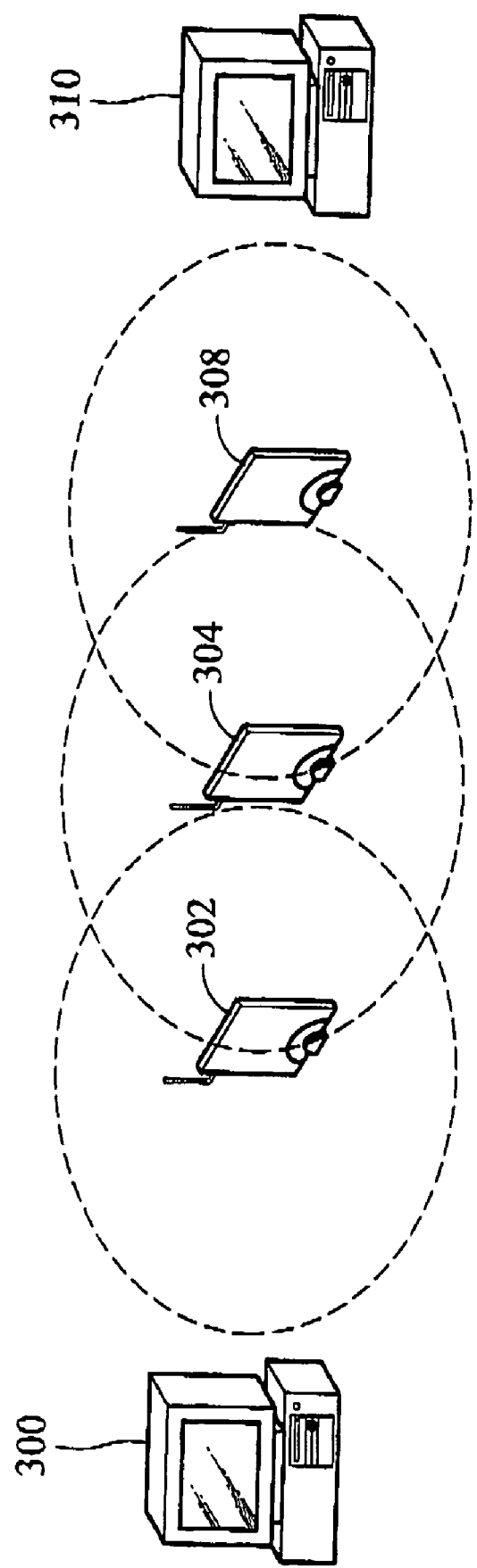
FIG. 7 is a system architecture diagram for communication connection via heterogeneous networks according to a third embodiment of the invention.

FIG. 7 is a diagram of the system architecture for communication connection via heterogeneous networks according to a third embodiment of the invention. The system includes repeaters 302, 304 and 308, and computers 300 and 310. The computers 302 and 310 respectively connect to the repeaters 302 and 308 via Ethernet. The repeater 304 acts as an intermediary for wireless data transmission between repeaters 302 and 308.

The third embodiment illustrates a scenario wherein the computer 300 transmits data to the computer 310 via both wireless LAN and wired Ethernet using multiple repeaters.

The computer 300 transmits a first data packet 50 to the repeater 302. The first data packet 50 includes a DA 52 for a MAC address of the computer 310, a SA 54 for a MAC address of the computer 300, a communication type 56 and data 58.

The repeater 302 receives the first data packet 50 and attaches the first tunnel header 60 thereto. The first tunnel header 60 comprises a RA 62 for a MAC address of the repeater 304, a TA 64 for a MAC address of the repeater 302 and a type 66 comprising a constant "0x5628" indicating that the first data packet 50 is transmitted via Ethernet. The repeater 302 subsequently transmits a first wireless data packet including both the first tunnel header 60 and the first data packet 50 to the repeater 304 according to the content of the RA 62.

The repeater 304 receives the first wireless data packet, removes the first tunnel header 60 therefrom, and attaches a second tunnel header 70 thereto. The second tunnel header 70 comprises a RA 72 for a MAC address of the repeater 308, a TA 74 for a MAC address of the repeater 304 and a type 66 comprising a constant "0x5628" indicating that the first data packet 50 is transmitted through Ethernet. The repeater 304 subsequently transmits the first updated wireless data packet including both the second tunnel header 70 and the first data packet 50 to the repeater 308 according to the content of the RA 72.

The repeater 308 receives the first updated wireless data packet, removes the second tunnel header 70 therefrom to acquire the first data packet 50, and transmits the first data packet 50 to the computer 310 according to the content of the DA 52.

The system and method of association mining of the present invention considers the exhibition period of each individual transaction and provides an intelligent support calculation basis for each item, reducing process time and improving result usability.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for communication connection in a wireless network comprising a plurality of wireless bridges individually associated with at least one electronic device, performing the steps of:
   (a) a first electronic device transmitting a first data packet to a first wireless bridge, the first data packet comprising a source address for a first identity corresponding to the first electronic device, and a destination address for a second identity corresponding to a second electronic device;
   (b) the first wireless bridge attaching a first tunnel header to the first data packet to form a first wireless data packet, and transmitting the first wireless data packet via the wireless network, the first tunnel header comprising a third identity corresponding to the first wireless bridge;
   (c) a second wireless bridge receiving the first wireless data packet via the wireless network, removing the first tunnel header therefrom to acquire a second data packet, storing an association relationship between the first electronic device and the first wireless bridge, and transmitting the second data packet to the second electronic device; and
   (d) the second electronic device receiving the second data packet, respectively employing the first identity and the second identity as a destination address and a source address, and transmitting data to the first electronic device.

2. The method as claimed in claim 1 further comprising a step of the first electronic device and the second electronic device establishing communication connection with each other.

3. The method as claimed in claim 1 wherein the step (b) further comprises a step of (e) the first wireless bridge transmitting the first wireless data packet using a broadcast method.

4. The method as claimed in claim 1 wherein the step (b) further comprises a step of (f) one of the wireless bridges other than the first wireless bridge receiving and acquiring the broadcasted wireless data packet, and storing the association relationship between the first electronic device and the first wireless bridge according to the first identity and the third identity.

5. The method as claimed in claim 1 wherein the step (d) further comprises the steps of:
   (g) the second electronic device transmitting a third data packet to the second wireless bridge, the third data packet comprising the first identity as a destination address, and the second identity as a source address;
   (h) the second wireless bridge attaching a second tunnel header to the third data packet to form a second wireless data packet according to the stored association relationship, the second tunnel header comprising a receiving address for the third identity, and a temporary transmission address for a fourth identity corresponding to the second wireless bridge;
   (i) the first wireless bridge receiving the second wireless data packet, removing the second tunnel header to acquire a fourth data packet, and storing an association relationship between the second wireless bridge and the second electronic device; and
   (j) the first electronic device receiving the fourth data packet.

6. The method as claimed in claim 1 wherein the first tunnel header further comprises a receiving address for a broadcast method, and a packet type.

7. The method as claimed in claim 6 wherein the second tunnel header further comprises a receiving address for the first wireless bridge and the packet type.

8. The method as claimed in claim 7 wherein the packet type comprises "0x5628".

9. The method as claimed in claim 7 wherein the wireless bridge comprises an extended bridge, an inter-building bridge or a repeater.

10. A system for communication connection utilized in a wireless network comprising a plurality of wireless bridges for communication connection with at least one electronic device, comprising:
    a first electronic device, located in the wireless network, and transmitting a packet;
    a first wireless bridge, corresponding to the first electronic device, receiving the packet, attaching a tunnel header thereto to form a wireless data packet, and broadcasting the wireless data packet;
    a second wireless bridge, located in the wireless network, receiving the wireless data packet from the first wireless bridge, and removing the tunnel header therefrom to acquire the packet; and
    a second electronic device, corresponding to the second wireless bridge, receiving the packet from the second wireless bridge.

11. The system as claimed in claim 10 wherein the packet comprises a first identity corresponding to the second electronic device, and does not be received by any electronic device other than the second electronic device.

12. The system as claimed in claim 10 wherein the tunnel header further comprises a receiving address for a broadcast method, and a packet type.

13. The system as claimed in claim 12 wherein the packet type comprises "0x5628".

14. The system as claimed in claim 10 wherein the wireless bridge comprises an extended bridge, an inter-building bridge or a repeater.

15. A method for communication connection utilized in a wireless network comprising a plurality of wireless bridges for communication connection with at least one electronic device, performing the steps of:
    a first electronic device transmitting a packet to a first wireless bridge, the packet comprising a first identity corresponding to the first electronic device;
    the first wireless bridge attaching a tunnel header to the packet to form a wireless data packet, the tunnel header comprising a second identity corresponding to the first wireless bridge;
    the first wireless bridge broadcasting the wireless data packet to a second wireless bridge via the wireless network; and
    the second wireless bridge storing an association relationship between the first wireless bridge and the first electronic device according to the first identity and the second identity.

16. The method as claimed in claim 15 wherein the tunnel header further comprises a receiving address for a broadcast method, and a packet type.

17. The method as claimed in claim 16 wherein the protocol type comprises "0x5628".

18. The method as claimed in claim 15 wherein the wireless bridge comprises an extended bridge, an inter-building bridge or a repeater.

* * * * *